(12) United States Patent
Lin et al.

(10) Patent No.: US 7,526,765 B2
(45) Date of Patent: Apr. 28, 2009

(54) METHOD AND APPARATUS FOR ON-DEMAND RESOURCE ALLOCATION AND JOB MANAGEMENT

(75) Inventors: Wuqin Lin, Briarcliff Manor, NY (US); Zhen Liu, Tarrytown, NY (US); Charalambos Stavropoulos, Tarrytown, NY (US); Cathy Honghui Xia, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1300 days.

(21) Appl. No.: 10/723,230

(22) Filed: Nov. 26, 2003

(65) Prior Publication Data

US 2005/0114860 A1 May 26, 2005

(51) Int. Cl.
*G06F 9/46* (2006.01)
(52) U.S. Cl. .................. 718/102; 718/100; 718/104; 718/105
(58) Field of Classification Search ............ 718/100, 718/102, 104, 105
See application file for complete search history.

(56) References Cited

U.S. PATENT DOCUMENTS 6,393,433 B1 * 5/2002 Kalavade et al. ............ 707/200
6,430,594 B1 * 8/2002 Akiyama et al. ............ 718/108
6,601,035 B1 * 7/2003 Panagos et al. ................ 705/8
2002/0184293 A1 * 12/2002 Cheeniyil et al. ............ 709/103
2005/0144234 A1 * 6/2005 Tanaka et al. ................ 709/205

OTHER PUBLICATIONS

Kise, et al., "A Solvable Case of the One-Machine Scheduling Problem with Ready and Due Times," Operations Research, 26(1), Jan.-Feb. 1978, 121-126.
Towsley, et al., "On the Optimality of Minimum Laxity and Earliest Deadline Scheduling for Real-Time Multiprocessors," Proc. of EUROMICRO Workshop on Real Time, Jun. 1990, pp. 17-24.

* cited by examiner

*Primary Examiner*—Van H Nguyen
*Assistant Examiner*—Kenneth Tang

(57) ABSTRACT

The invention is a method and apparatus for on-demand resource planning for unified messaging services. In one embodiment, multiple clients are served by a single system, and existing system resources are allocated among all clients in a manner that optimizes system output and service provider profit without the need to increase system resources. In one embodiment, resource allocation and job scheduling are guided by individual service level agreements between the service provider and the clients that dictate minimum service levels that must be achieved by the system. Jobs are processed in a manner that at least meets the specified service levels, and the benefit or profit derived by the service provider is maximized by prioritizing incoming job requests within the parameters of the specified service levels while meeting the specified service levels. Thus, operation and hardware costs remain substantially unchanged, while system output and profit are maximized.

1 Claim, 6 Drawing Sheets

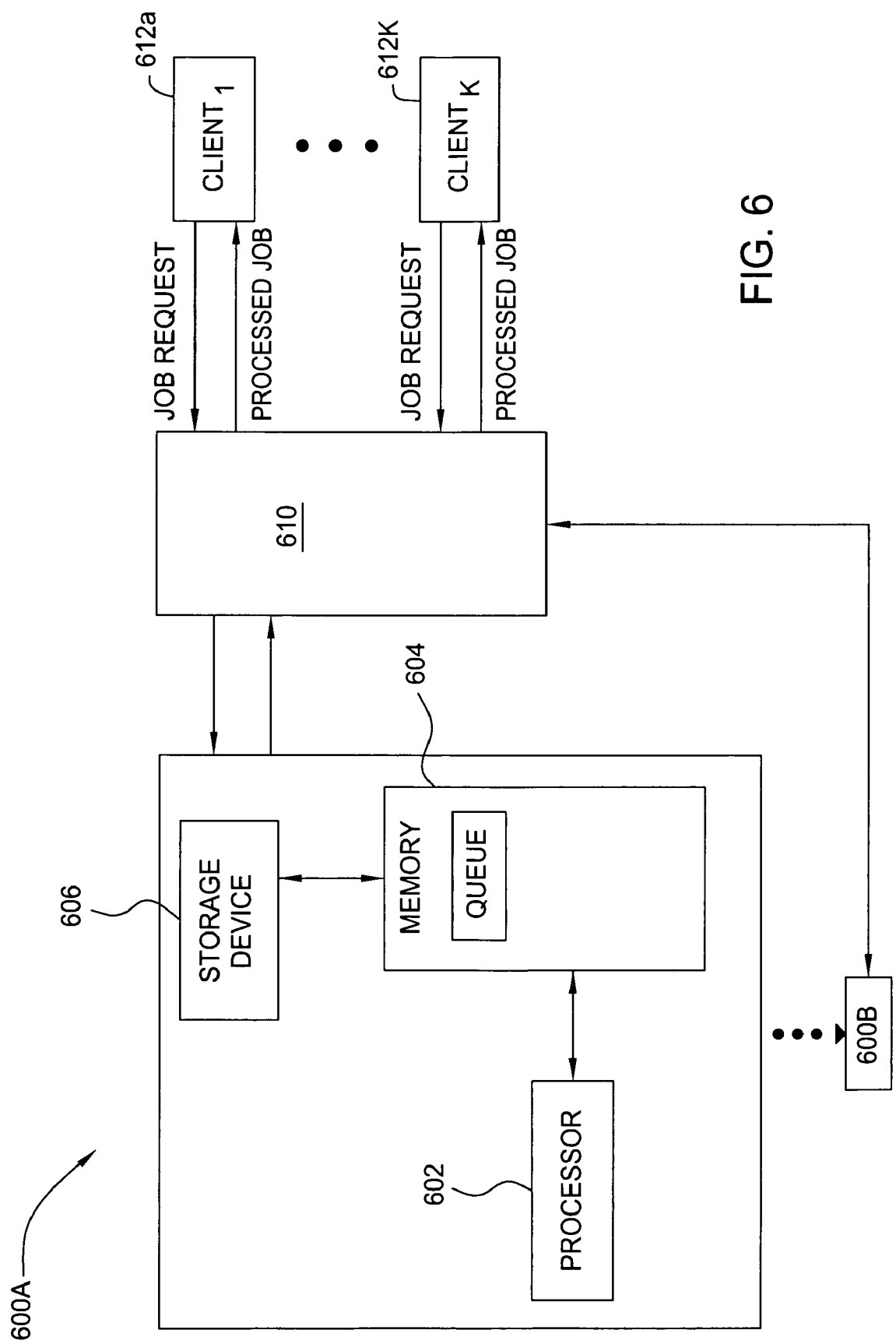

METHOD AND APPARATUS FOR ON-DEMAND RESOURCE ALLOCATION AND JOB MANAGEMENT

BACKGROUND

The present invention relates generally to on-demand resource allocation, and relates more particularly to resource planning for messaging services. Specifically, the invention is a method and apparatus for on-demand management of messaging jobs.

In order to effectively compete in today's telecommunication market, service providers and enterprises are turning toward unified messaging technology. Unified messaging platforms (e.g., Voice over IP—or VoIP) and applications thereof such as voice mail transcription are typically characterized by real-time constraints, predictable processing times and some tolerance to loss.

Hard deadlines and estimated service times are associated with incoming requests (e.g., voicemails to be transcribed or VoIP packets) to unified messaging services, and failure to meet a deadline will result in a dismissal of the request; quality of service is defined by the proportion of requests successfully processed. Computing resources such as servers and message or packet proxies, relays or routers are used to process requests, and these resources must be allocated in a way that processes incoming requests in a timely and efficient manner. Conventional on-line scheduling systems for unified messaging systems tend to process incoming requests on a first come, first served basis, i.e., in the order in which the requests are received. Processing deadlines or estimated processing times are not considered in establishing the order in which requests are processed. Consequently, resources may not be optimally allocated to process incoming requests, resulting in many requests being only partially processed, or not processed at all, by the time their deadlines expire. To reduce losses, it is often necessary to allocate additional resources to process requests, thereby increasing the costs of operation. It is therefore desirable that an existing unified messaging service system be optimized so that the proportion of lost or dismissed requests does not exceed a predetermined threshold.

Thus, there is a need in the art for a method and apparatus for on-demand resource planning for unified messaging services.

SUMMARY OF THE INVENTION

In one embodiment, the invention is a method and apparatus for on-demand resource planning and job management for unified messaging services. In one embodiment, multiple clients are served by a single system, and existing system resources are allocated among all clients in a manner that optimizes system output and service provider profit without the need to increase system resources. In one embodiment, resource allocation and job scheduling are guided by individual service level agreements between the service provider and the clients that dictate minimum service levels that must be achieved by the system. Jobs are processed in a manner that at least meets the specified service levels. The benefit or profit derived by the service provider is maximized by prioritizing incoming jobs while meeting the specified service levels. Thus, operation and hardware costs remain substantially unchanged, while system output and profit are maximized.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 6 is a block diagram of a system for executing the method in accordance with embodiments of the present invention.

To facilitate understanding, identical reference numerals have been used, where possible, to designate identical elements that are common to the figures.

DETAILED DESCRIPTION

The invention is a method and apparatus for on-demand resource planning and job management for unified messaging services. In one embodiment, information concerning job volume and job deadlines is provided by a service level agreement (SLA) between the service provider and a client. To illustrate, a service provider, e.g., a telephone company, may provide unified messaging services to its customers. For example, a customer may subscribe to a particular unified messaging service, e.g., where a voicemail message is transcribed into a text message and is forwarded to the customer, e.g., via an email or text message sent to the customer's computer, cell phone, PDA or similar devices. The constraints or quality of service is often specified in a service level agreement (SLA), e.g., specifying the timeliness of transcribing the voicemail after it is received. It is important that the promised quality of service is achieved to the extent possible, given the available resources.

In one embodiment, the invention takes into account information available concerning processing times of incoming jobs, and allocates resources according to the estimated process times of existing and incoming job requests. In another embodiment, resources are allocated based on the cost to the service provider of processing a request, and the benefit derived by the service provider as a result of fulfilling the request.

Figure 1:
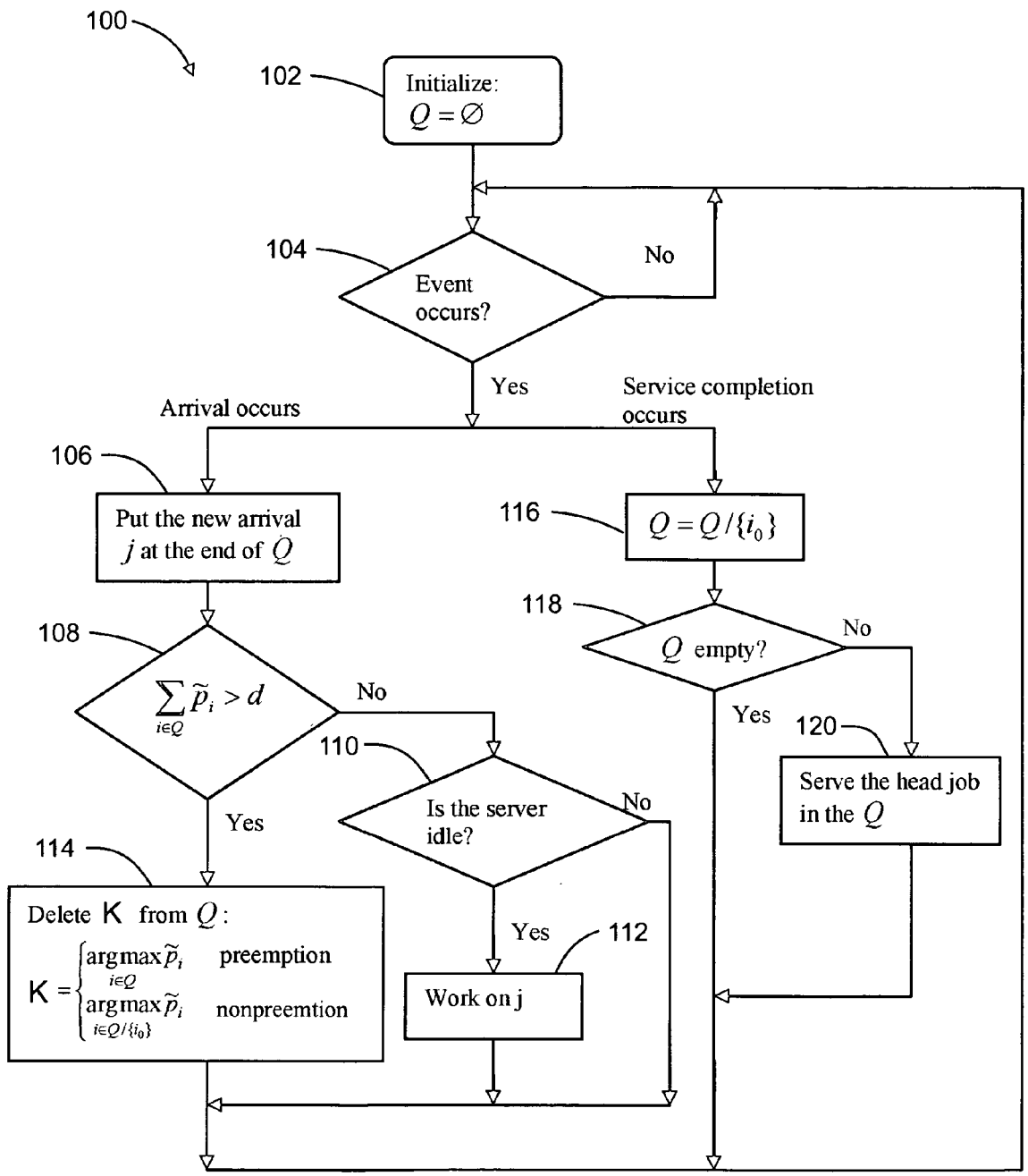
FIG. 1 is a flow diagram of one embodiment of a method for online scheduling for incoming job requests.

FIG. 1 is a flow diagram of one embodiment of a method 100 for online scheduling for incoming job requests. In this embodiment, Q represents the queue of jobs maintained by a unified messaging system. The queue Q includes all jobs received by the system that have not been completed, e.g., unprocessed and partially processed jobs. All jobs that enter the queue Q are characterized by at least two pieces of information: (1) the estimated amount of time necessary to complete the job; and (2) the deadline for completing the job.

The method 100 is initialized at step 102, and at step 104 the method 100 checks to see if a triggering event has occurred. In one embodiment, a triggering event is either the arrival of a new job request j, or the completion of a job $i_0$. In one embodiment, the triggering event is the arrival of a new job request j, and the new job request j is moved to the end of the queue Q at step 106. In this embodiment, all jobs in the queue Q assume the same relative deadlines (e.g., as is often the case in service contracts). In another embodiment, at least some of the jobs in the queue Q have different relative deadlines, and the queue Q is ordered so that the jobs with the earliest deadlines are closer to the head of the queue Q (e.g., in order of increasing deadlines). In this embodiment, step 106 inserts the new job request j into the queue Q at a point where the immediately preceding job has an earlier deadline than the new job request j and the immediately following job has a later deadline than the new job request j.

The method 100 then determines whether the arrival of the new job request j places a cumulative demand upon the system that exceeds the system's processing capabilities. Specifically, at step 108, the method 100 determines whether the cumulative processing time for all jobs in the queue Q, $$\sum_{i \in Q} \tilde{p}_i,$$

is greater than or smaller than the longest deadline d among all jobs in the queue Q. Both the cumulative processing time $$\sum_{i \in Q} \tilde{p}_i$$

and the longest deadline d vary over time. If the cumulative processing time $$\sum_{i \in Q} \tilde{p}_i$$

is not greater than the longest deadline d, the method proceeds to step 110 to determine whether the server is busy. If the server is busy, the new job request j remains at the end of the queue Q, and the method 100 returns to step 104. If the server is idle, the server begins to process the new job request j at step 112.

If the cumulative processing time $$\sum_{i \in Q} \tilde{p}_i$$

is greater than the longest deadline d, the system proceeds to step 114 to determine how to free up system resources to process the remaining jobs in the queue Q. If pre-emption is allowed for jobs, at step 114 the system finds the job k in the queue Q for which the most time is needed for processing (i.e., k is the longest job in the queue Q), and in one embodiment the system deletes the longest job k from the queue Q. In another embodiment, if the longest job k has already been started, but it will require more time than the processing time of any other job in the queue Q to complete, the system stops processing the longest job k and switches to the next job in the queue Q. Alternatively, the system may set the longest job k aside temporarily and resume processing the longest job k later, rather than delete the longest job k completely from the queue Q. Alternatively, if pre-emption is not allowed, in one embodiment the system will allow the processing to complete for the head job in the queue Q, and the system will find the longest job k among the remaining jobs in the queue Q. In one embodiment, the system deletes the longest job k. In another embodiment, the system temporarily sets the longest job k aside.

If the triggering event is instead a service completion (i.e., the completion of processing on an existing job), as determined in step 104, the method 100 proceeds to step 116 to update the current state of the queue Q upon departure of the completed job $i_0$. The system 100 then determines at step 118 whether there are any remaining jobs in the queue Q. If there are no remaining jobs in the queue Q, the method 100 returns to step 104. If there are remaining jobs in the queue Q, the system processes the job at the head of the queue, i.e., the job with the most immediate deadline in step 120.

The method 100 thus allocates service resources by prioritizing incoming job requests based on the estimated job completion times and the deadlines for each particular job. Consequently, service resources may be allocated more efficiently than in conventional methods such as first come, first served systems, resulting in a lower percentage of job losses. Thus, the method 100 provides more efficient service of job requests without having to allocate additional system resources.

Figure 2:
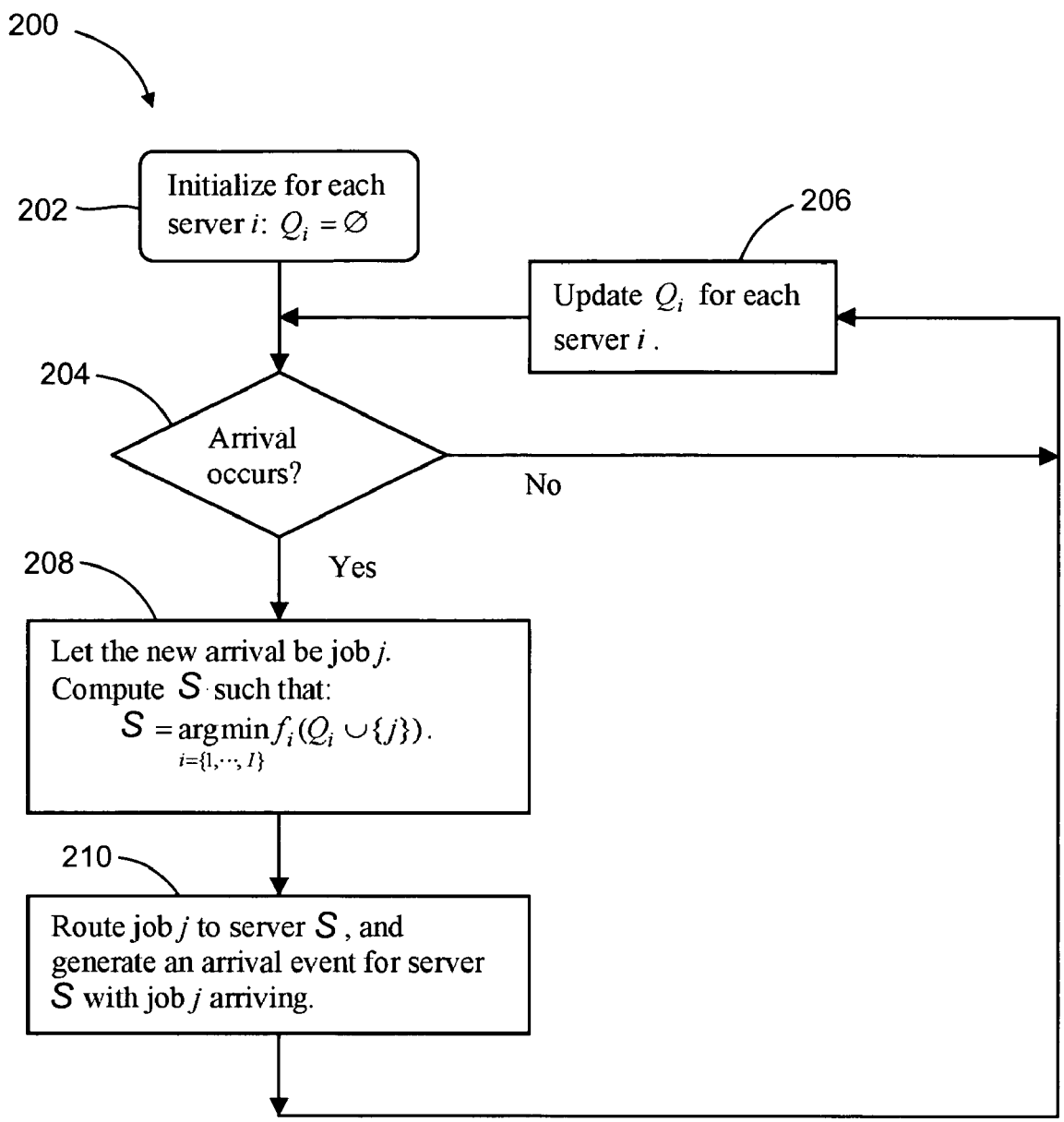
FIG. 2 is a flow diagram illustrating one embodiment of a method for routing incoming job requests.

In one embodiment, the efficiency of the method 100 is enhanced by optimizing the routing of incoming job requests to two or more servers (e.g., general purpose computers, workstations or mini computers). FIG. 2 is a flow diagram illustrating one embodiment of a method 200 for routing incoming job requests. In one embodiment, the system employs I parallel servers, and i represents any server 1-I in the system. $Q_i$ represents the individual queue for any given server i. The method 200 is initialized at step 202 and is performed simultaneously for all I servers in the system. Once the method 200 is initialized for a server i, the system checks to see if a new job request has been sent to the system at step 204. If there are no new job request arrivals, the queue $Q_i$ is updated accordingly for each server i at step 206.

If the query at step 204 reveals that a new job request j has arrived in the system, the method 200 proceeds to step 208. At step 208, the method 200 compares the queues $Q_i$ for all servers 1-I in the system, to determine which server S will be able to complete the new job request j in the shortest amount of time (i.e., which server can complete the job j the soonest). In one embodiment, the scheduling method 100 described with reference to FIG. 1 is used to compute the total completion time for each server i. Thus, if $f_i(Q_i \cup \{j\})$ is the estimated completion time of all jobs in $Q_i$ including the new job request j, the server S that will be able to complete the new job request j in the shortest amount of time is $$\operatorname*{argmin}_{i=\{1,\ldots,I\}} f_i(Q_i \cup \{j\}).$$

At step 210, the new job request j is routed to the server S, and an arrival event (e.g., step 106 in method 100) is generated at the server S. The queue $Q_i$ at the server S is updated at step 206, and in one embodiment, the method 200 merges with the method 100 at step 106, where the method 100 is initiated as described with reference to FIG. 1.

The method 200 does not necessarily require that all servers have similar processing speeds. In fact, in one embodiment, the method 200 is initialized for a group of I parallel servers, wherein at least some of the servers 1-I have different operating criteria (e.g., different processing speeds, capacity or CPU power). In this embodiment, the estimated completion times $f_i(Q_i \cup \{j\})$ for each server i will be a factor of the server i's processing speed.

Figure 3:
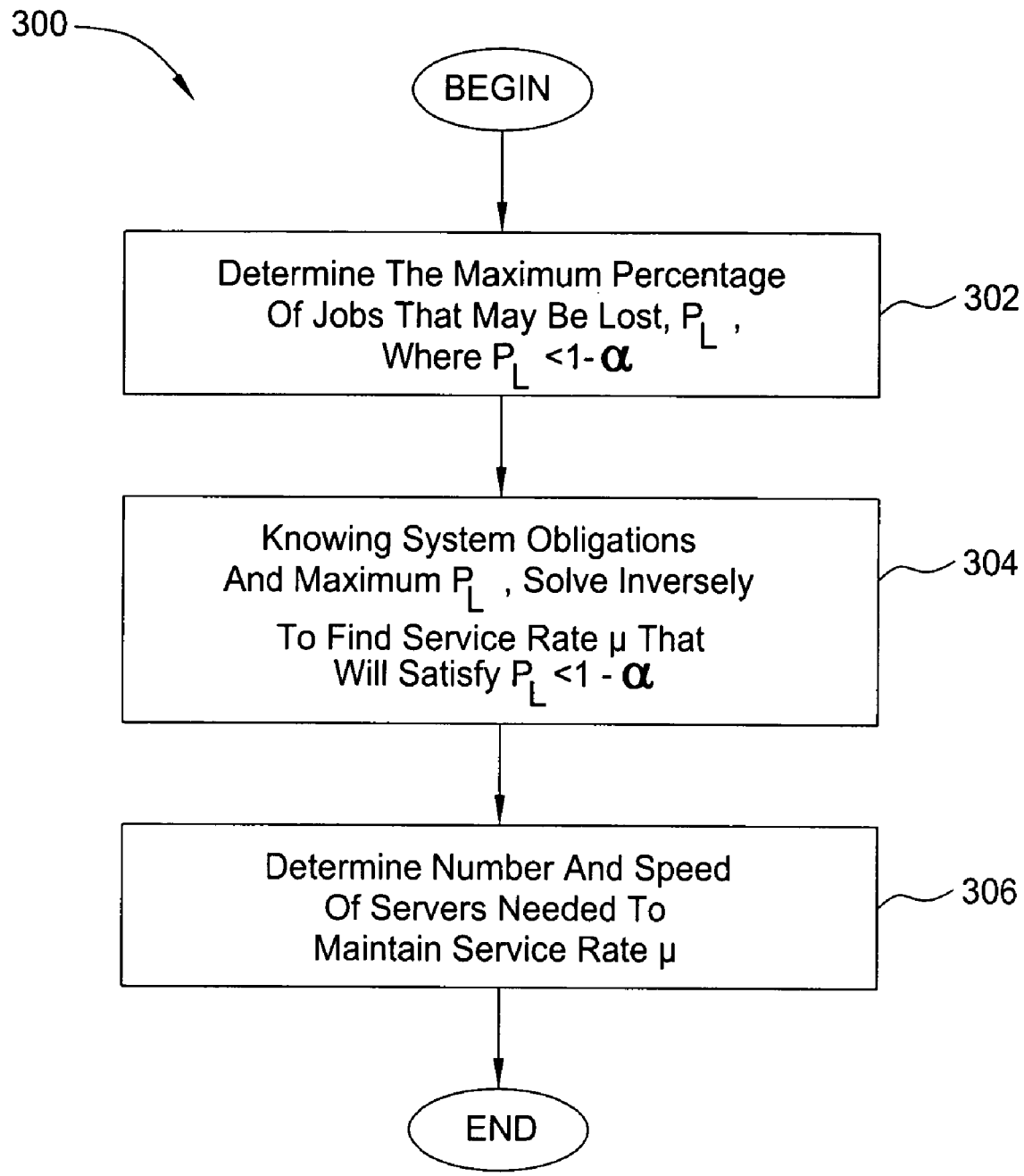
FIG. 3 is a flow diagram illustrating one embodiment of a method for estimating the minimum system capacity required to efficiently process an estimated job request volume.

FIG. 3 is a flow diagram illustrating one embodiment of a method 300 for estimating the minimum system capacity $\mu$ (e.g., the minimum number of servers) required to efficiently process an estimated job request volume, for example as detailed in an SLA with a client. The client will direct that a percentage $\alpha$ of the incoming jobs should be processed within a time d. The system capacity $\mu$ must be selected to handle the traffic intensity $\rho$ that will be directed toward the system. The traffic intensity $\rho$ is the arrival rate $\lambda$ of new job requests divided by the service rate (i.e., capacity) $\mu$; thus the traffic intensity $\rho$ can be thought of as, for example, a server's load per minute.

The requisite capacity $\mu$ may be estimated by determining $P_L$, which is the percentage of jobs that can be lost by the server or system without violating the obligations under the SLA to process a percent of incoming jobs in d time (step 302). $P_L$ must be less than 1-$\alpha$, and may derived by relating the known parameters defined by the client such that $$P_L = B_0 e^{-(\mu-\lambda)d - \rho(1-e^{-\mu d})} \quad \text{(EQU. 1)}$$

where $B_0$ is a normalization factor that can be expressed as a function of $\lambda$, $\rho$ and d as follows:

$$B_0 = (1 - \lambda \int_0^d (1 - e^{-\mu(d-x)}) e^{-(\mu-\lambda)x - \rho e^{-\mu d}(e^{\mu x}-1)} dx \quad \text{(EQU. 2)}$$

Thus, $$1 - \alpha > e^{-(\mu-\lambda)d - \rho(1-e^{-\mu d})} \quad \text{(EQU. 3)}$$

$$\left( \left(1 + \lambda \int_0^d (1 - e^{-\mu(d-x)}) e^{-(\mu-\lambda)x - \rho e^{-\mu d}(e^{\mu x}-1)} dx \right)^{-1} \right.$$

and the capacity $\mu$ that will guarantee that a percent of jobs will be processed within d time may be solved for inversely (step 304). Note that x is a dummy variable that one may consider as the time that has elapsed, e.g., 0>x>d. Once the requisite capacity $\mu$ is known, the number and speed of system servers that will support the capacity $\mu$ can be determined (step 306).

Figure 4:
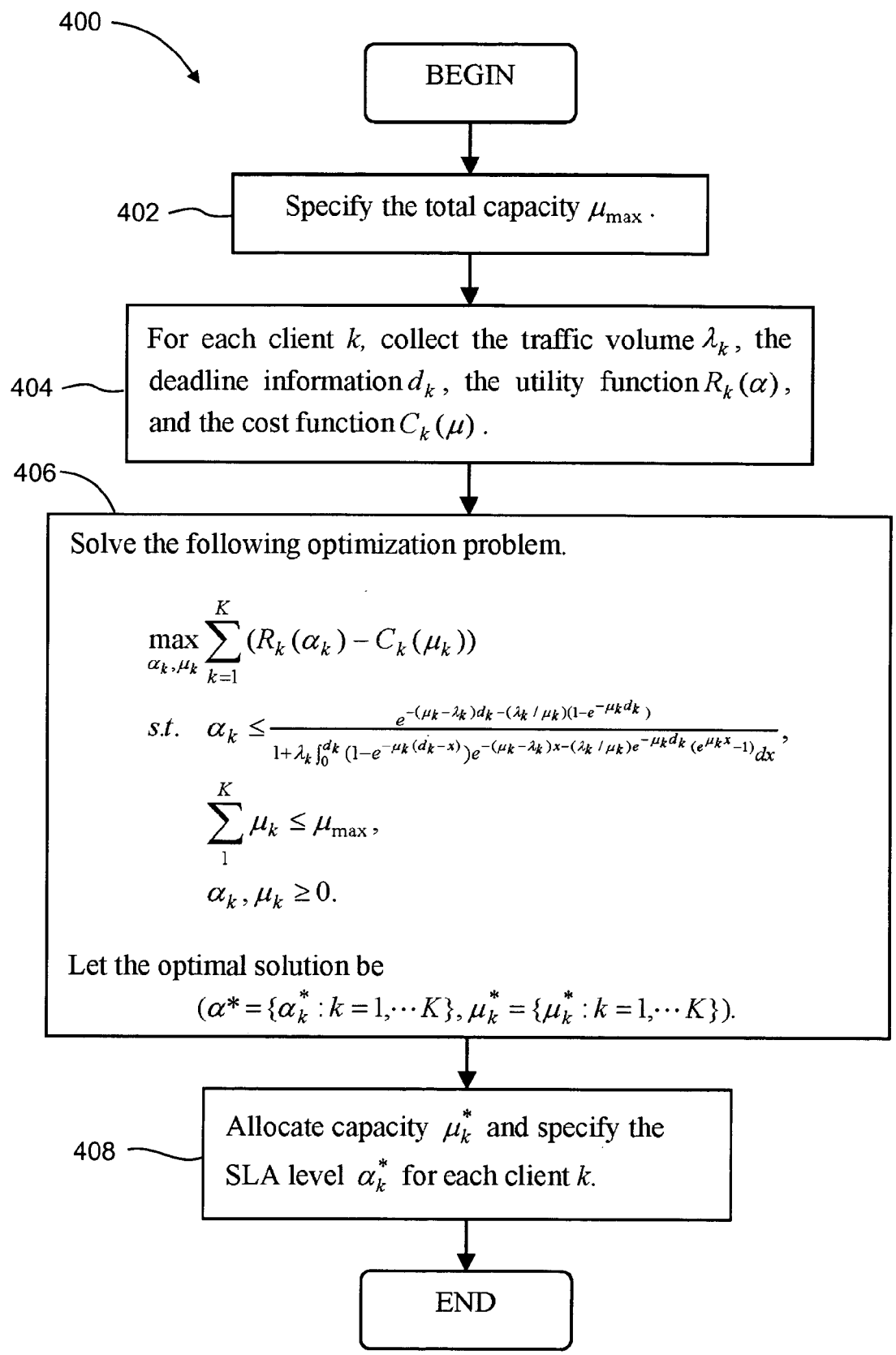
FIG. 4 is a flow diagram illustrating one embodiment of a method for determining the utility of various levels of services in a resource-sharing environment.

In one embodiment, scheduling of job requests (for example as described with reference to FIG. 1) is at least partially based on a cost/benefit analysis. FIG. 4 is a flow diagram illustrating one embodiment of a method 400 for determining the utility of various levels of services in a resource-sharing environment, e.g., where several clients are served by the same unified messaging system. In cases where all incoming job requests cannot be satisfied, the utility (or cost) of delivering to a first client may be greater than the utility (or cost) of delivering to a second client. In these cases, it is necessary to allocate system resources and services in the most efficient way among all clients.

The total capacity of the system, $\mu_{max}$ is determined or specified at step 402. At step 404, the traffic volume $\lambda_k$, the deadline information $d_k$, the utility function $R_k(\alpha)$ and the cost function $C_k(\mu)$ are collected for each client k. The utility function $R_k(\alpha)$ is defined as the benefit or profit derived by the service provider for satisfying the client k's incoming requests (e.g., payment for fulfilling the SLA), and the cost function $C_k(\mu)$ is defined as the cost to the service provider of satisfying the client k's incoming requests.

Step 406 illustrates one embodiment of an algorithm for optimizing the service level and capacity allocated to clients 1-K, based on the information collected in step 404. If the service provider assigns a capacity $\mu_k$ to client k, then the utility (or profit) derived from client k will be the payment $R_k(\alpha_k)$ based on an achieved service level of $\alpha_k = 1 - P_L(\mu_k, \lambda_k, d_k)$ minus the cost $C_k(\mu_k)$ of providing the resource $\mu_k$. Thus, to maximize the total system utilization, or $\Sigma_k U_k(\mu k, \lambda k, dk)$, step 406 considers $$\max_{\alpha_k, \mu_k} \sum_{k=1}^{K} (R_k(\alpha_k) - C_k(\mu_k)) \quad \text{(EQU. 4)}$$

so that $$\alpha_k \leq \frac{e^{-(\mu_k - \lambda_k)d_k - (\lambda_k/\mu_k)(1 - e^{-\mu_k d_k})}}{1 + \lambda_k \int_0^{d_k} (1 - e^{-\mu_k(d-x)})},$$

$$e^{-(\mu_k - \lambda_k)x - (\lambda_k/\mu_k)e^{-\mu_k d_k}(e^{\mu_k x}-1)} dx$$

so that $\sum_{1}^{K} \mu_k \leq \mu_{max}$, and so that $\alpha_k, \mu_k \geq 0$.

The optimal solution is therefore ($\alpha^* = \{\alpha^*_k : k=1, \ldots, K\}$, $\mu^* = \{\mu^*_k : k=1, \ldots, K\}$), where $\alpha^*_k$ is the optimal service level specified and $\mu^*_k$ is the optimal service capacity allocated for the client k (see step 408).

Figure 5:
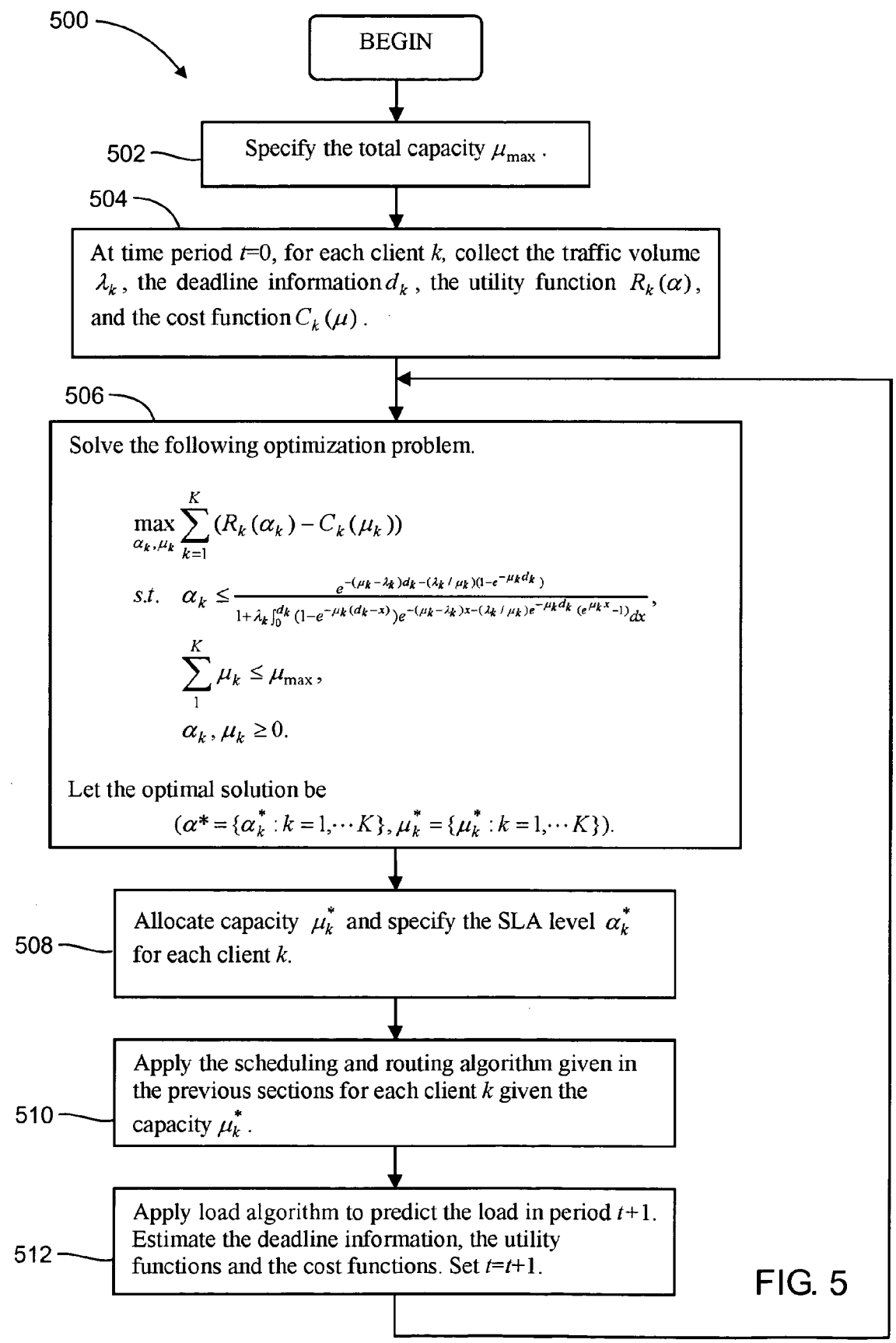
FIG. 5 is a flow diagram illustrating one embodiment of a method for carrying out the methods described with reference to FIGS. 1-4 on demand.

FIG. 5 is a flow diagram illustrating one embodiment of a method 500 for carrying out the methods 100, 200, 300 and 400, described with reference to the preceding Figures, on demand (i.e., in real time). At step 502, the total system capacity $\mu_{max}$ is specified. At time period t=0, information including traffic volume $\lambda_k$, deadline d, utility function $R_k(\alpha)$ and cost function $C_k(\mu)$ are collected for each client k (step 504). At step 506, the optimal solution ($\alpha^* = \{\alpha^*_k : k=1, \ldots, K\}, \mu^* = \{\mu^*_k : k=1, \ldots, K\}$) is determined, and in one embodiment, the optimal solution is derived according to the algorithm illustrated in step 406 of FIG. 4.

Once the system has been optimized, optimal service level $\alpha^*_k$ and optimal capacity $\mu^*_k$ are allocated for the client k, where k=1, \ldots, K (step 508). For each client k that is allocated the capacity $\mu^*_k$, a scheduling method such as that described with reference to FIG. 1 and a routing method such as that described with reference to FIG. 2 are applied (step 510). For a subsequent time period t+1, the deadline information d, the utility functions $R_k(\alpha)$ and cost functions $C_k(\mu)$ are estimated for each client k. In one embodiment, the information for the time period t=t+1 is estimated according to the load algorithms disclosed by commonly assigned U.S. patent application Ser. No. 10/315,705, filed Dec. 10, 2002 by Halim et al., which is hereby incorporated by reference in its entirety.

Applying the method 500, the time-varying needs of different clients (e.g., in terms of changes in the observed loads and cost functions) can be accommodated and temporary increases and/or decreases in required capacity can be anticipated and allocated in a timely and efficient manner. By applying the method 500 described with reference to FIG. 5, a service provider can avoid over-provisioning to meet service level agreements, which can result in significant losses, e.g., in waste of resources. Furthermore, a service provider can use the information derived from the above-described process 100, 200, 300, 400 and 500 to negotiate service level agreements with clients.

FIG. 6 is a high-level block diagram of the present invention implemented using a general purpose computing device 600A. In one embodiment, a general purpose computing device 600A comprises a processor 602, a memory 604 and at least one storage device 606 (e.g., a disk drive, an optical disk drive, a floppy disk drive). In one embodiment, the method for on-demand resource allocation and job management described herein with reference to the preceding Figures can be implemented as a software application that is retrieved from the storage device 606 and is loaded onto the memory 604. In one embodiment, the general purpose computing device 600A is in communication with an on-demand resource allocation and job management system 610, which is in communication with at least one client 612a-k (hereinafter referred to as "clients 612"). The on-demand resource allocation and job management system 610 comprises at least one router in communication with at least one server. As illustrated, the clients 612 send job requests to the on-demand resource allocation and job management system 610. Job requests are stored in a queue, and, in one embodiment, the queue is stored in the memory 604 of the general purpose computer 600A. The processor 602 can then execute the method in the memory in accordance with embodiments of the present invention. Processed jobs are returned to the clients 612. As such, it is contemplated that some and/or all of the steps of the methods and the data structure discussed above can be stored on a computer readable medium.

In one embodiment, a general purpose computing device 600 comprises a processor 602, a memory 604 and at least one storage device 606. In one embodiment, a method for execution by the on-demand resource allocation and job management system 610 (e.g., any of the resource allocation or job management methods described herein) can be implemented as a software application that is retrieved from the storage device 606 and is loaded onto the memory 604. The processor 602 can then retrieve the method from the memory 604 and execute the method in accordance with embodiments of the present invention.

Thus, the present invention represents a significant advancement in the field of unified messaging services. A method is provided that optimizes the performance and allocation of service system resources on-line, i.e., allocation is assigned in real time as the system continuously evolves. The on-line nature of the scheduling, routing and capacity planning methods disclosed herein makes the method easily adaptable to changing system demands. Thus, system failures or losses may be minimized without the need to allocate additional resources to the system and increasing system costs. The methods disclosed herein may have applications not only in unified messaging systems, but can be adapted to other real-time computer systems, telecommunications, manufacturing, and military applications.

While foregoing is directed to the preferred embodiment of the present invention, other and further embodiments of the invention may be devised without departing from the basic scope thereof, and the scope thereof is determined by the claims that follow.

The invention claimed is:

1. A method for optimizing an allocation of system resources, comprising:

determining, for each source from which a system receives job requests, a minimum percentage of job requests to be processed by the system, where the system receives job requests from at least two separate sources;

allocating system resources among the at least two separate sources to meet at least one job processing obligation and to maximize a total profit of the system; and scheduling a processing order of new job requests on-line, wherein said scheduling is accomplished by:

determining a completion deadline for a new job request;

determining an estimated process time for the new job request as a length of time needed to process the new job request by the completion deadline; and scheduling processing for the new job request based on the completion deadline and the estimated process time as compared to completion deadlines and estimated process times for existing jobs in the system;

routing the new job request to a server in the system that can complete processing for the new job request soonest;

assigning the new job request to an end of a job queue of the server;

determining whether a cumulative length of time necessary to process all jobs in the job queue, including the new job request, exceeds a latest completion deadline among all jobs in the job queue; and temporarily stopping work on a job in the job queue having a longest estimated processing time, if the cumulative length of time necessary to process all jobs in the job queue, including the new job request, exceeds the latest completion deadline among all jobs in the job queue.

* * * * *